United States Patent
Gonzalez Martin et al.

(10) Patent No.: US 11,822,311 B2
(45) Date of Patent: Nov. 21, 2023

(54) GENERATION OF REPRESENTATIONS OF THREE-DIMENSIONAL OBJECTS USING BOOLEAN OPERATIONS

(71) Applicant: HEWLETT-PACKARD DEVELOPMENT COMPANY, L.P., Spring, TX (US)

(72) Inventors: Sergio Gonzalez Martin, Sant Cugat del Valles (ES); Jordi Gonzalez Rogel, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/240,588

(22) Filed: Apr. 26, 2021

(65) Prior Publication Data
US 2022/0342384 A1    Oct. 27, 2022

(51) Int. Cl.
   *G05B 19/4099*    (2006.01)
   *B33Y 50/00*    (2015.01)

(52) U.S. Cl.
   CPC .......... *G05B 19/4099* (2013.01); *B33Y 50/00* (2014.12); *G05B 2219/35134* (2013.01); *G05B 2219/49023* (2013.01)

(58) Field of Classification Search
   CPC ...... G05B 19/4099; G05B 2219/35134; G05B 2219/49023; B33Y 50/00
   See application file for complete search history.

(56) References Cited

U.S. PATENT DOCUMENTS

| | | | |
|---|---|---|---|
| 2015/0145171 A1* | 5/2015 | Walker | B29C 64/135 |
| | | | 425/150 |
| 2018/0104895 A1* | 4/2018 | Slaczka | B29C 33/3835 |
| 2019/0114829 A1 | 4/2019 | Abello Rosello et al. | |
| 2019/0362543 A1* | 11/2019 | Zeng | G06F 30/00 |
| 2020/0223144 A1 | 7/2020 | Sanroma Garrit et al. | |
| 2021/0356939 A1* | 11/2021 | Eom | G05B 19/4145 |

OTHER PUBLICATIONS

Constructive Solid-Geometry Methods downloaded on Mar. 29, 2021 (15 pages).
Dyllong et al., Verified Adaptive Octree Representations of Constructive Solid Geometry Objects, 2007 (13 pages).
Steuer, Methods for Polygonalization of a Constructive Solid Geometry Description in Web-based Rendering Environments, Dec. 21, 2012 (64 pages).
Van Gumster, Making and preparing 3D models for printing with Blender, Jul. 21, 2016 (11 pages).
Wikipedia, Constructive solid geometry last edited Feb. 2, 2021 (5 pages).

* cited by examiner

Primary Examiner — Christopher E. Everett
Assistant Examiner — Yvonne Trang Follansbee
(74) Attorney, Agent, or Firm — Michael Dryja

(57) ABSTRACT

In some examples, a system receives a first representation of structures to be combined for building a three-dimensional (3D) object by an additive manufacturing machine; and generates, based on the first representation, a second representation comprising voxels that represent the 3D object, the generation of the second representation comprising an evaluation of Boolean operations with respect to voxels in a voxel space to produce the second representation.

13 Claims, 6 Drawing Sheets

US 11,822,311 B2

GENERATION OF REPRESENTATIONS OF THREE-DIMENSIONAL OBJECTS USING BOOLEAN OPERATIONS

BACKGROUND

Additive manufacturing machines produce three-dimensional (3D) objects by building up layers of build material, including a layer-by-layer accumulation and solidification of the build material patterned from computer aided design (CAD) models or other digital representations of physical 3D objects to be formed. A type of an additive manufacturing machine is referred to as a 3D printing system. Each layer of the build material is patterned into a corresponding part (or parts) of the 3D object.

BRIEF DESCRIPTION OF THE DRAWINGS

Some implementations of the present disclosure are described with respect to the following figures.

Figure 1:
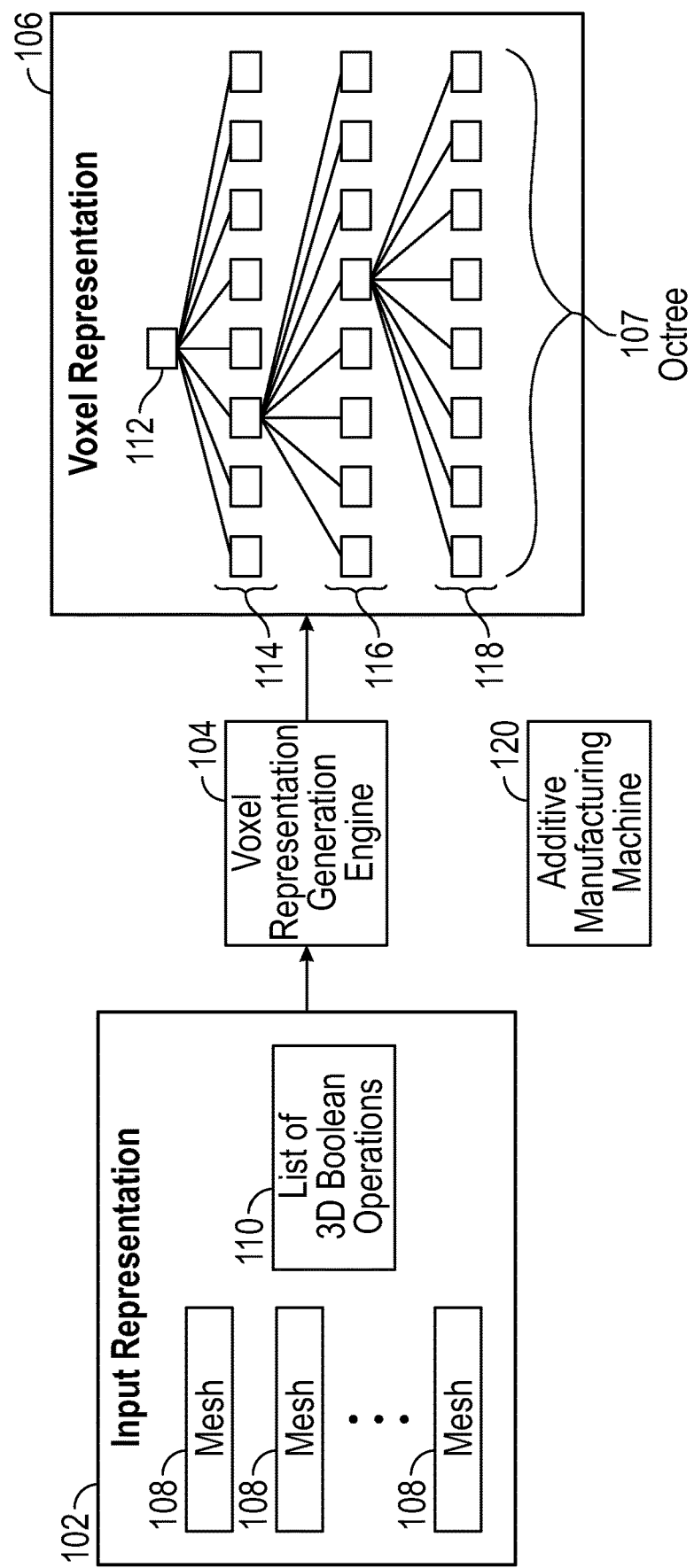
FIG. 1 illustrates an arrangement to generate a voxel representation including voxels representing a three-dimensional (3D) object from an input representation that includes structures to be combined for building the 3D object by an additive manufacturing machine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Constructive Solid Geometry (CSG) can be used as part of a process of building three-dimensional (3D) objects by additive manufacturing machines. In some examples, CSG can be applied on polygonal meshes included in a digital representation of a 3D object. A CAD model can have any or some combination of the following formats: a STereo-Lithographic (STL) file, an OBJ file, a Drawing Exchange Format (DXF) file, a JavaScript Object Notation (JSON) file, a 3D Manufacturing Format (3MF) file, a Visualization Toolkit (VTK) file, or the like.

A polygonal mesh (e.g., a triangular mesh or a mesh of another polygonal shape) represents a surface of a portion of the 3D object. A "mesh" in 3D space can refer to any digital structure (or more simply, "structure") that represents a surface in 3D space. A CAD model or other digital representation of a 3D object can include an arrangement of meshes in 3D space.

With CSG, structures can be formed by combining primitives (e.g., meshes) that represent simpler parts, such as spheres, cubes, cylinders, and so forth. Primitives can be combined using 3D Boolean operations that are applied on the primitives to produce resultant structures. Further 3D Boolean operations can be applied on the resultant structures to combine the resultant structures with other resultant structures or primitives. Applying 3D Boolean operations on resultant structures can allow for the creation of further structures.

Examples of Boolean operations include a union, an intersection, and a difference (or subtraction). A union of primitives merges the primitives into a resultant structure. An intersection of primitives produces a resultant structure that is common to both primitives. A difference of primitives subtracts one primitive from another primitive to produce a resultant structure. More generally, a "Boolean operation" is an operation performed on multiple primitives or other structures. A "3D Boolean operation" is an operation performed on multiple primitives or other structures in 3D space.

As used here, "combining" primitives or other structures based on application of a 3D Boolean operation can refer to performing a union of the primitives or other structures, or performing an intersection of the primitives or other structures, or performing a difference (subtraction) of the primitives or other structures, or any other operation in which two or more primitives or other structures are processed together to produce a resultant structure.

3D Boolean operations applied on meshes in mesh space can grow in complexity as meshes are combined to produce resultant meshes that are in turn combined with other meshes. The increasing complexity of 3D Boolean operations applied on meshes (especially complex meshes) can result in intensive use of resources, including processing resources, storage resources, and/or communication resources. Additionally, in some cases, Boolean operations applied on meshes may produce resultant meshes that may not be printable, in which case additional processing would have to be performed on such resultant meshes.

In accordance with some implementations of the present disclosure, 3D Boolean operations are applied to voxels in voxel space as part of generating a representation of voxels for a 3D object to be built by an additive manufacturing machine. The representation of the voxels for the 3D object includes an octree of nodes that represent the respective voxels. In some examples, a system (which can be the additive manufacturing machine or a computer external of the additive manufacturing machine) receives a first representation of structures (e.g. primitives such as polygonal meshes) to be combined for building the 3D object by the additive manufacturing machine. The system generates, based on the first representation, a second representation including an octree representing voxels that represent the 3D object. The generation of the second representation includes an application of 3D Boolean operations to voxels in voxel space and to the structures (e.g., meshes) in the first representation to produce the second representation. Applying 3D Boolean operations during the construction of a representation including voxels avoids performing the 3D Boolean operations on meshes to combine the meshes, which can be complex if the meshes being combined are complex, and which may result in producing resultant structures in an output representation that may not be printable.

FIG. 1 illustrates an arrangement in which a voxel representation generation engine 104 receives an input representation 102 of a 3D object, and produces, based on the input representation 102 of the 3D object, a voxel representation 106 of the 3D object.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

In some examples, the voxel representation 106 of the 3D object includes an octree 107 of nodes, where each node of the octree 107 represents a respective voxel. In the octree 107 of nodes, a root node 112 represents a largest volume, and the largest volume is divided into octants represented by child nodes 114. The volume represented by each child node 114 can further be divided into further octants that are represented by another level of child nodes 116. Further, the volume represented by each child node 116 can further be divided into additional octants that are represented by a further level of child nodes 118. The number of levels of the octree 107 (i.e., the depth of the octree 107) depends on a target resolution of a 3D object when built by an additive manufacturing machine 120, or based on an input parameter (e.g., supplied by a user, a program, or a machine).

The input representation 102 includes an arrangement of meshes 108, such as polygonal meshes, that define surfaces of the 3D object to be built based on the input representation 102. Some of the meshes 108 are to be combined (e.g., by a union operation, an intersection operation, a difference operation, etc.) using 3D Boolean operations, as represented by a list of 3D Boolean operations 110. The list of 3D Boolean operations can be expressed by using descriptions of the 3D Boolean operations as part of input job information relating to building of the 3D object. For example, the descriptions can be expressed using a computing language, such as a proprietary language, an open-source language, or a standardized language. The list of 3D Boolean operations can be part of the input representation 102, or can be part of separate information.

Some of the meshes 108 in the input representation 102 can be associated with a Boolean operation or multiple Boolean operations of the list of 3D Boolean operations 110. If a mesh 108 is associated with a given 3D Boolean operation, then the given 3D Boolean operation is used to combine the mesh 108 with another mesh 108 (or multiple other meshes 108). If a mesh 108 is associated with a multiple 3D Boolean operations, then the multiple 3D Boolean operations are used to combine the mesh 108 with another mesh 108 (or multiple other meshes 108).

In accordance with some implementations of the present disclosure, rather than applying the 3D Boolean operations in the list 110 on the meshes 108 to combine the meshes 108, the 3D Boolean operations of the list 110 are applied as part of constructing the voxel representation 106 by the voxel representation generation engine 104.

The voxel representation generation engine 104 can be part of the additive manufacturing machine 120 or part of a computer that is separate from the additive manufacturing machine 120. In examples where the voxel representation generation engine 104 is separate from the additive manufacturing machine 120, the voxel representation 106 produced by the voxel representation generation engine 104 is transmitted to the additive manufacturing machine 120, such as over a network between the computer and the additive manufacturing machine 120. The additive manufacturing machine 120 uses the voxel representation 106 to build the corresponding 3D object.

Figure 2C:
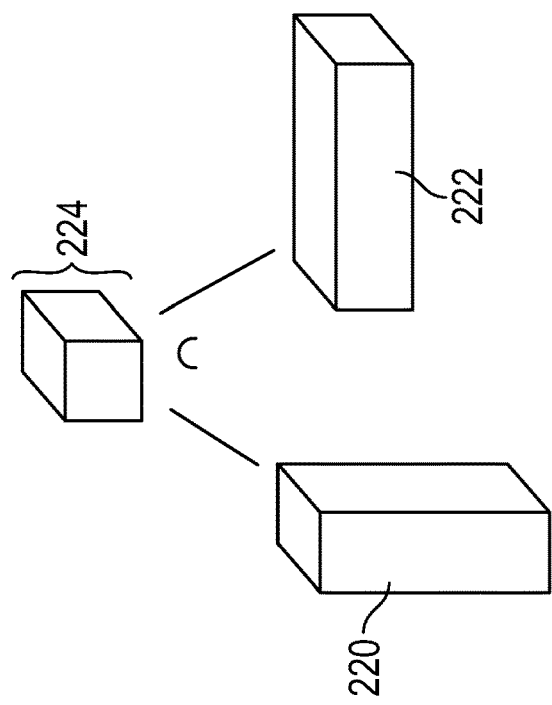
FIGS. 2A-2C illustrate 3D Boolean operations to be applied in voxel representation generation processes according to some examples.
Figure 2B:
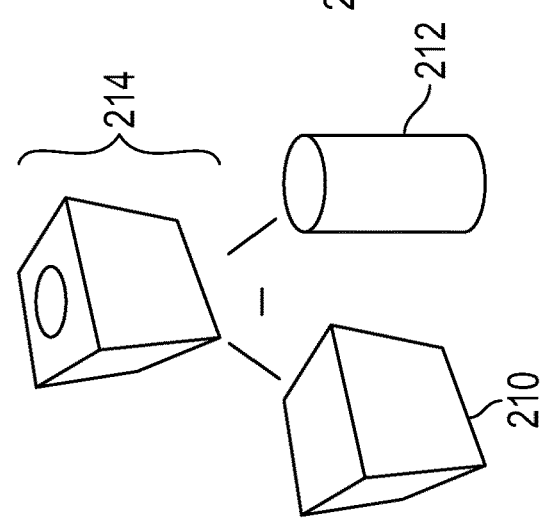
Figure 2A:
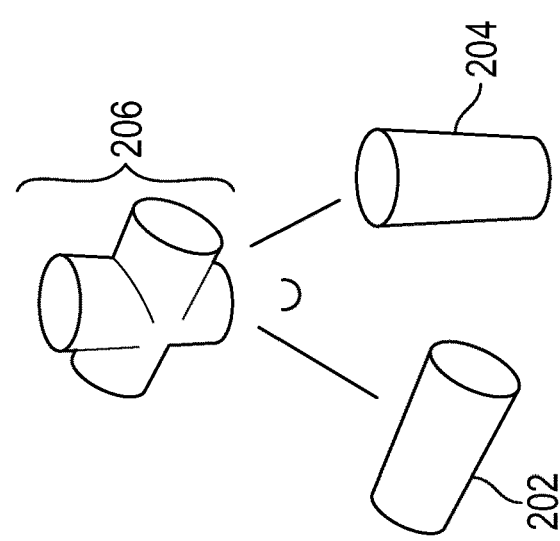

FIGS. 2A-2C illustrate example 3D Boolean operations. FIG. 2A illustrates a union of a first cylinder 202 with a second cylinder 204. The first cylinder 202 extends horizontally, while the second cylinder 204 extends vertically. The union of the first and second cylinders 202 and 204 produces a resultant structure 206. The shape of the resultant structure 206 is based on a merger of the shapes of the first and second cylinders 202 and 204. Generally, a union of multiple primitives is represented as union(a, b, c, d, . . . )=((a∪b)∪c)∪d . . . .

FIG. 2B illustrates a difference of a cube 210 with a cylinder 212, which produces a resultant structure 214. The shape of the resultant structure 214 is based on the shape in the cube 210 that is not in the cylinder 212. Generally, a difference of multiple primitives is represented as difference (a, b, c, d, . . . )=((a−b)−c)−d− . . . =a−union(b, c, d, . . . ).

FIG. 2C illustrates an intersection of a rectangular cylinder 220 with a rectangular cylinder 222, which produces a resultant structure 224. The shape of the resultant structure 224 is based on the common (clipping) shape in the rectangular cylinders 220 and 224. Generally, an intersection is represented as intersection(a, b, c, d, . . . )=((a∩b)∩c)∩d . . . .

Figure 3:
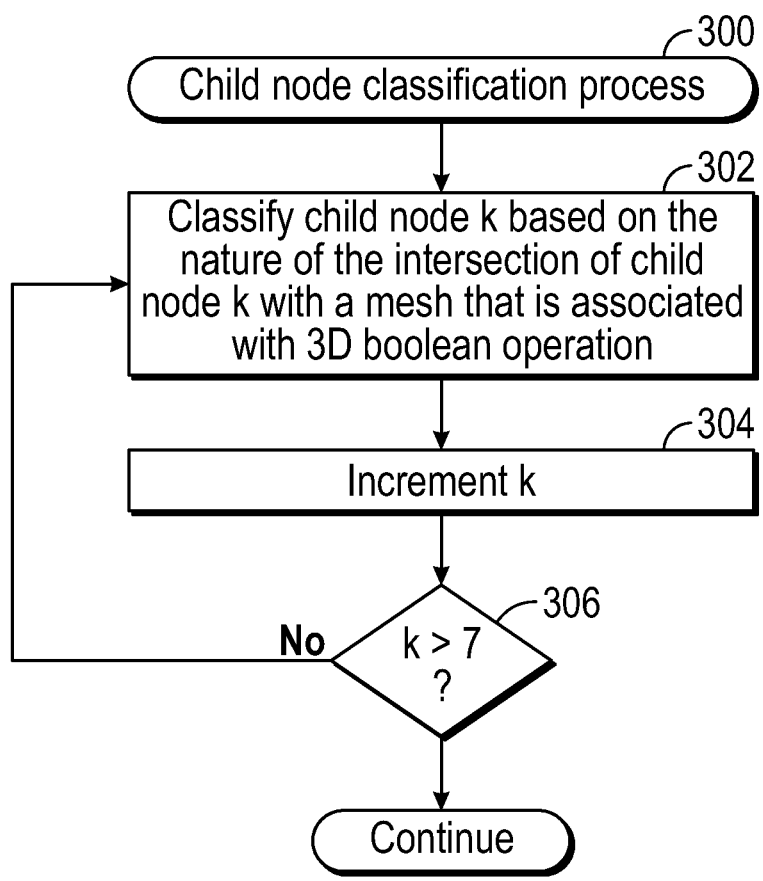
FIG. 3 is a flow diagram of a child node classification process according to some examples.

FIG. 3 is a flow diagram of an example classification process 300 of classifying child nodes of a parent node when constructing an octree of nodes (e.g., the octree 107 of FIG. 1). In some examples, the classification of child nodes includes classifying each child node as black, white, or gray. A respective child node is assigned a corresponding color depending upon the following factors: 1) whether the respective child node represents a volume that is completely within, completely outside, or partially within and partially outside of a corresponding mesh 108 that is associated with a 3D Boolean operation (e.g., included in the list of 3D Boolean operations 110 in FIG. 1), and 2) the type of the 3D Boolean operation (e.g., union operation, intersection operation, or difference operation).

If a child node is assigned the color black, then the voxel represented by the child node is part of a 3D object to be built by the additive manufacturing machine 120. If a child node is assigned the color white, then the voxel represented by the child node is not part of the 3D object to be built by the additive manufacturing machine 120. If a child node is assigned the color gray, then a part of the voxel represented by the child node is part of the 3D object, and another part of the voxel represented by the child node is not part of the 3D object. The child node that is assigned the color gray can further be divided into 8 octants at a deeper level of the octree, and the child nodes corresponding to the 8 octants are further assigned colors based on the above criteria.

Although reference is made to assigning specific colors to corresponding child nodes, in other examples, other indicators can be assigned to child nodes for indicating whether respective voxels are part of a 3D object to be built.

Each node of the octree represents a volume (voxel) that may overlap a mesh 108 (i.e., the volume is contained within or partially overlaps with the mesh 108 included in the input representation 102). Some of the meshes 108 may be associated with 3D Boolean operation(s) (these 3D Boolean operation(s) is (are) applied to these meshes 108), while other meshes 108 may not be associated with any 3D Boolean operation (i.e., no 3D Boolean operation is to applied on any of these other meshes 108). The classification of child nodes in the process of FIG. 3 when constructing the octree classifies just those child nodes that overlap meshes 108 associated with 3D Boolean operation(s). The classification of child nodes in the process of FIG. 3 when constructing the octree does not classify other child nodes that overlap meshes 108 not associated with 3D Boolean operation(s), or simply may classify such other child nodes with the color white.

Note that there may be other classification processes that assign colors to child nodes, and the assignment of colors to child nodes in the FIG. 3 process can be combined with the classifications of such other classification processes.

The classification process 300 classifies (at 302) each child node k (k=0 to 7) divided from a parent node, based on the nature of the overlapping of child node k with a mesh 108 that is associated with a 3D Boolean operation, and further based on the type of 3D Boolean operation (task 302 is further discussed below in connection with FIG. 4). The "nature" of the overlapping of child node k with the mesh 108 can refer to one of the following: the voxel represented by child node k is completely within the mesh 108, the voxel represented by child node k is completely outside the mesh 108, and the voxel represented by child node k is partially within and partially outside the mesh 108

Once child node k is classified, the variable k is incremented (at 304), and a determination is made (at 306) whether k is greater than 7 (which would mean that all 8 child nodes of the parent node have been classified if k is initially set to 0).

If not, the classification process 300 proceeds to classify the next child node k. If k is greater than 7, then the child node classification process 300 is complete for a current level of the octree. If any child node is to be divided into octants at a deeper level, then the classification process 300 can be re-iterated for the child nodes at the deeper level of the octree.

Figure 4:
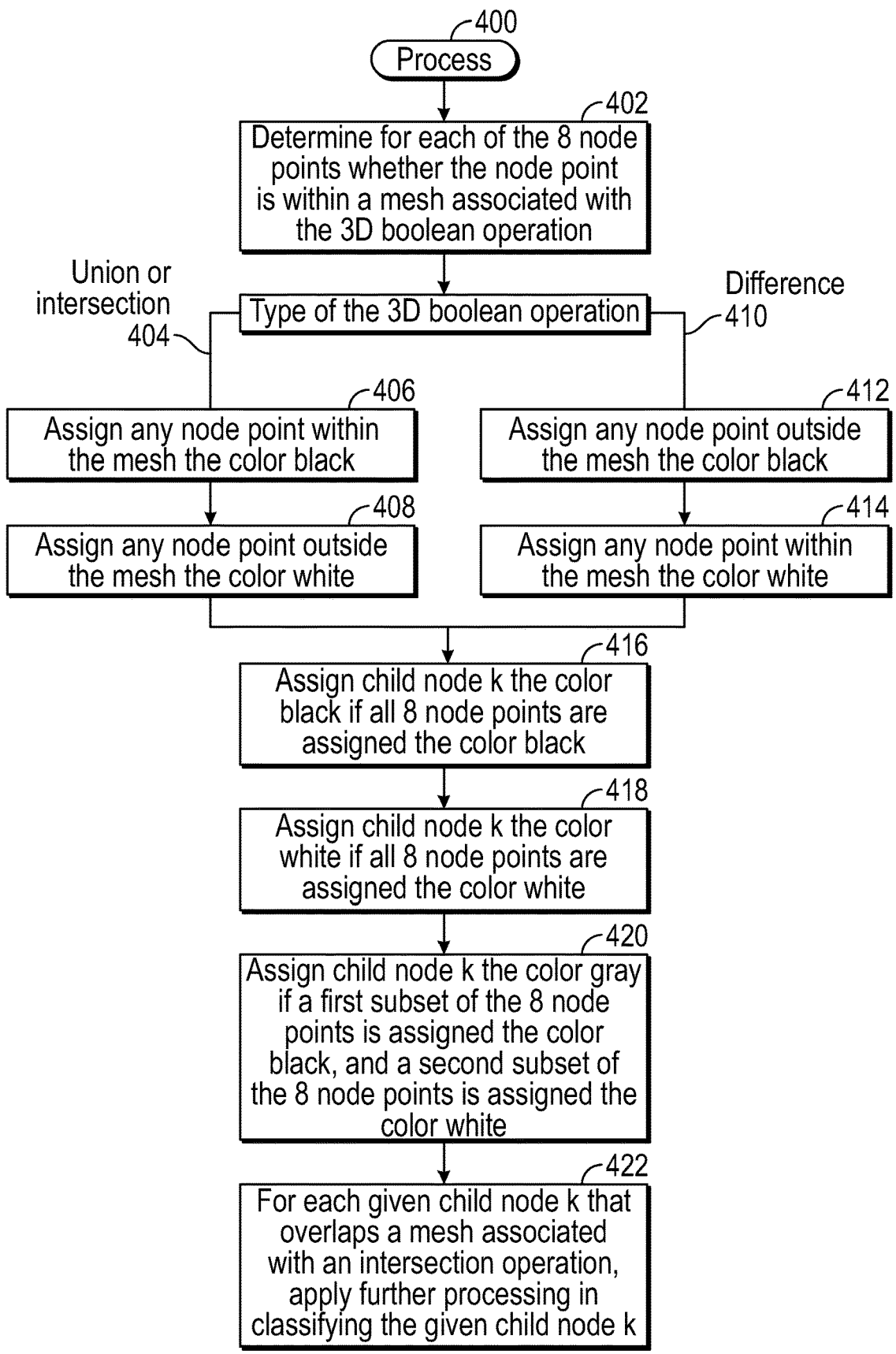
FIG. 4 is a flow diagram of assigning colors to a child node based on 3D Boolean operations, according to some examples.

The tasks of classifying child node k (at 302) are further depicted in a process 400 of FIG. 4. A child node represents a volume in a 3D object that is contained within a bounding box having 8 corners. In other examples, other bounding structures containing a volume of a child node can have a different bounding structure.

Assuming the example where the bounding box of the volume represented by child node k has 8 corners represented by 8 respective node points, the process 400 determines (at 402) for each of the 8 node points whether the node point is within a mesh 108 associated with the 3D Boolean operation. The process 400 assigns either the color black or the color white to a node point of a bounding box of child node k depending on the following factors: 1) the type of the 3D Boolean operation associated with the mesh 108, and 2) whether the node point is within or outside the mesh 108.

If the 3D Boolean operation associated with the mesh 108 is a union operation or an intersection operation (branch 404), the process 400 assigns (at 406) any node point that is within the mesh 108 the color black. The process assigns (at 408) assigns any node point that is outside the mesh 108 associated with 3D Boolean operation(s) the color white.

If the 3D Boolean operation associated with the mesh 108 is a difference operation (branch 410), the process 400 assigns (at 412) any node point that is within the mesh 108 the color white. The process assigns (at 414) any node point that is outside the mesh 108 associated with 3D Boolean operation(s) the color black.

The process 400 assigns (at 416) child node k the color black if all of the 8 node points of the bounding box of child node k are assigned the color black. The process 400 assigns (at 418) child node k the color white if all of the 8 node points of the bounding box of child node k are assigned the color white. The process 400 assigns (at 420) child node k the color gray if a first subset of the 8 node points of the bounding box of child node k is assigned the color black, and a second subset of the 8 node points of the bounding box of child node k is assigned the color white.

For each given child node k that overlaps a mesh associated with an intersection operation, further processing (at 422) is applied in classifying the given child node k. The given child node k is a child of a parent node that also overlaps the mesh associated with the intersection operation. If the parent node is assigned the color gray, then the given child node k is assigned the color gray even if the foregoing tasks assigned the given child node k a different color.

The further processing (at 422) is performed is that the intersection operation is handled in two phases. The first phase includes applying a union of the given child node k with the mesh associated with the intersection operation (tasks 406, 408, 416, 418, and 420). If the given chile node k is referred to as item A and the mesh associated with the intersection is referred to as item B, then the second phase includes removing the regions from item A which are not in item B and the regions in item B that are not in item A. In alternative examples, a third branch for the intersection case can extend from the decision block "Type of the 3D Boolean operation," and similar tasks performed.

Each node of the octree that is assigned the color white or black does not have to be further divided. However, each node of the octree that is assigned the color gray is further divided into 8 octants represented by 8 child nodes. The processes of FIGS. 3 and 4 are then re-iterated for the further divided child nodes. The process continues until no further nodes have to be divided, or until the target depth of the octree has been reached.

The colors assigned to the nodes of the octree can be used to determine whether or not the respective voxels represented by the nodes are part of the 3D object to be built by an additive manufacturing machine.

Figure 5:
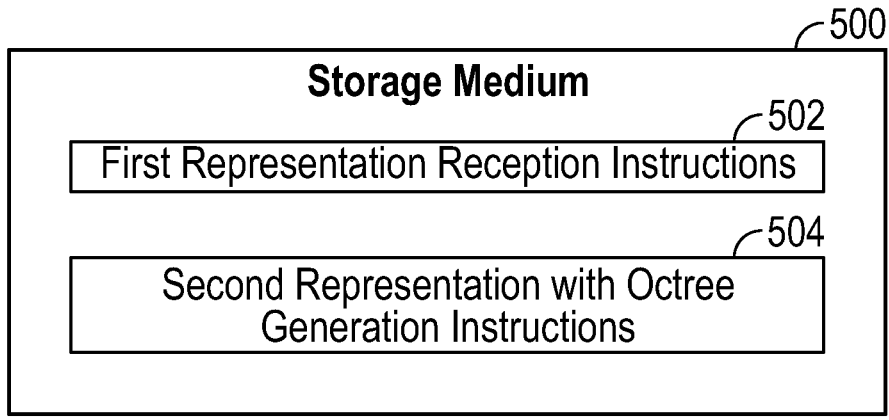
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The system can be an additive manufacturing machine, or a computer separate from the additive manufacturing machine.

The machine-readable instructions include first representation reception instructions 502 to receive a first representation of structures (e.g., meshes) to be combined (e.g., subject to a union operation, a difference operation, or an intersection operation) for building a 3D object by an additive manufacturing machine.

In some examples, the first representation is part of input job information relating to the 3D object to be built, and the input job information includes information of the Boolean operations (e.g., the list of 3D Boolean operations 110 in FIG. 1) that are associated with the structures.

The machine-readable instructions include second representation with octree generation instructions 504 to generate, based on the first representation, a second representation including an octree representing voxels that represent the 3D object, where the generation of the second representation includes an application of Boolean operations to the voxels in a voxel space and to the structures in the first representation to produce the second representation. The application of Boolean operations includes tasks 404 to 414 in FIG. 4.

In some examples, the generation of the second representation includes dividing a volume into sub-volumes (e.g., dividing a parent node into child nodes when constructing an octree) and determining whether each respective sub-volume of the sub-volumes is part of the 3D object based on if points of the respective sub-volume are within a structure (e.g., a mesh 108 in FIG. 1) associated with a Boolean operation. The determination of whether the respective sub-volume is part of the 3D object further depends upon a type of the Boolean operation (e.g., union operation, intersection operation, or difference operation).

In some examples, the machine-readable instructions indicate (e.g., assign a node the color black) that the respective sub-volume is part of the 3D object responsive to determining that the points (e.g., corner points of a bounding box of the respective sub-volume) of the respective sub-volume are within the structure and the Boolean operation being a union operation or intersection operation. The machine-readable instructions indicate (e.g., assign a node the color white) that the respective sub-volume is part of the 3D object responsive to determining that the points of the respective sub-volume are outside the structure and the Boolean operation being a difference operation. The machine-readable instructions indicate (e.g., assign a node the color gray) that the respective sub-volume is partially part of the 3D object and partially not part of the 3D object responsive to determining that a first subset of the points of the respective sub-volume is within the structure, and a second subset of the points of the respective sub-volume is outside the structure.

Figure 6:
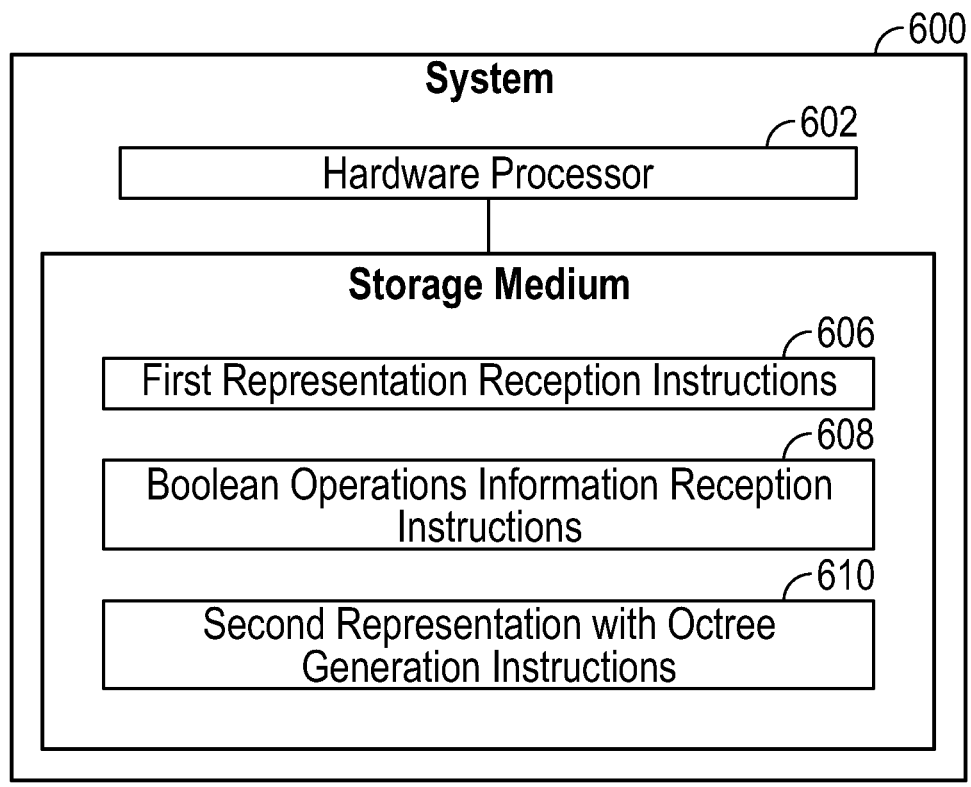
FIG. 6 is a block diagram of a system according to some examples.

FIG. 6 is a block diagram of a system 600 (e.g., an additive manufacturing machine or a computer) according to some examples. The system 600 includes a hardware processor 702 (or multiple hardware processors). A hardware processor can include a microprocessor, a core of a multi-core microprocessor, a microcontroller, a programmable integrated circuit, a programmable gate array, or another hardware processing circuit.

The system 600 includes a storage medium 604 storing machine-readable instructions executable on the hardware processor 602 to perform various tasks. Machine-readable instructions executable on a hardware processor can refer to the instructions executable on a single hardware processor or the instructions executable on multiple hardware processors.

The machine-readable instructions in the storage medium 604 include first representation reception instructions 606 to receive a first representation including structures to be combined to build a 3D object by an additive manufacturing machine.

The machine-readable instructions in the storage medium 604 include Boolean operations information reception instructions 608 to receive information of Boolean operations to be performed on the structures.

The machine-readable instructions in the storage medium 604 include second representation with octree generation instructions 610 to generate, based on the structures and the information of the Boolean operations, a second representation including an octree representing voxels that represent the 3D object, the generation of the second representation including an application of the Boolean operations to the voxels in a voxel space and to the structures in the first representation to produce the second representation.

In some examples, an octree of nodes representing the voxels is generated based on dividing parent nodes into child nodes, and assigning indicators (e.g., the color black, white, or gray) of whether the child nodes are part of the 3D object based on geometric relationships of volumes represented by the child nodes to the structures of the first representation, and on the Boolean operations associated with the structures.

Figure 7:
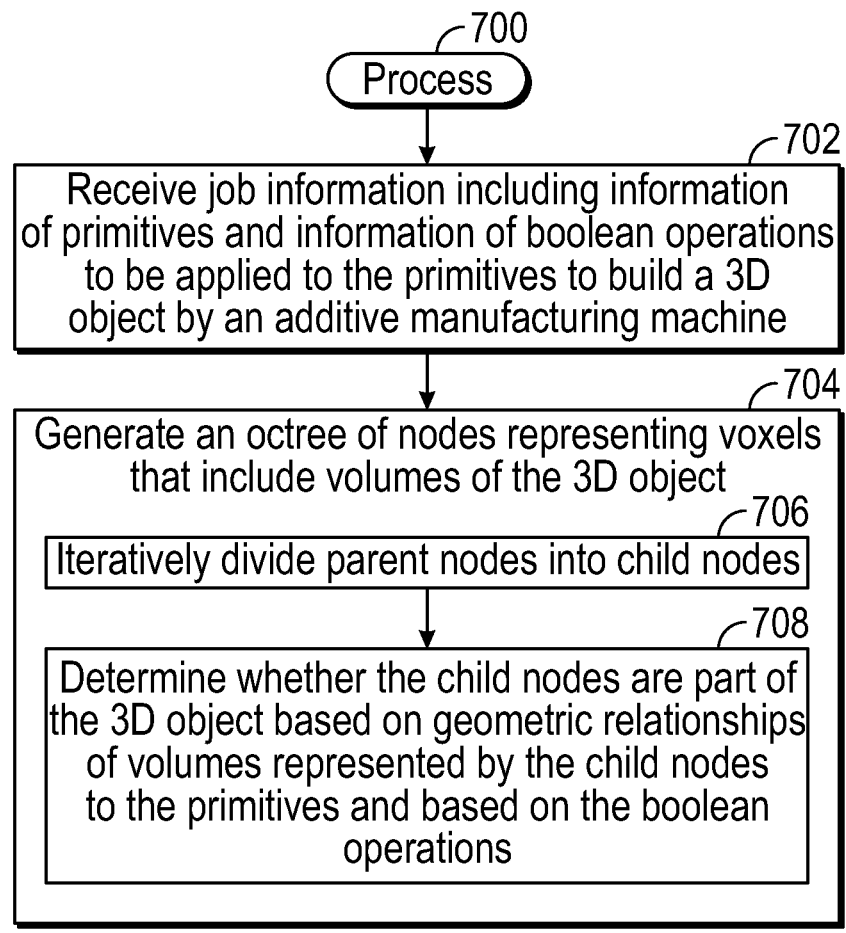
FIG. 7 is a flow diagram of a process according to some examples.

FIG. 7 is a flow diagram of a process 700 according to some examples, which can be performed by an additive manufacturing machine or a computer. The process 700 includes receiving (at 702) job information including information of primitives (e.g., polygonal meshes) and information of Boolean operations to be applied to the primitives to build a 3D object by an additive manufacturing machine.

The process 700 includes generating (at 704) an octree of nodes representing voxels that include volumes of the 3D object, where the generation of the octree includes iteratively dividing (at 706) parent nodes into child nodes, and determining (at 708) whether the child nodes are part of the 3D object based on geometric relationships of volumes represented by the child nodes to the primitives and based on the Boolean operations.

By applying 3D Boolean operations as part of generating voxels to produce a voxel representation, issues associated with applying 3D Boolean operations to meshes for combining the meshes can be avoided. Also, since the 3D Boolean operations are considered in the generation of the voxel representation, the voxel representation can be used during building of a 3D object by an additive manufacturing machine without having to resolve 3D Boolean operations at build time.

A storage medium (e.g., 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive a first representation of a three-dimensional (3D) object for building by an additive manufacturing machine,
      wherein the first representation comprising specifies a list of mesh structures and a list of Boolean operations, and associates each Boolean operation with two or more of the mesh structures,
      wherein for each Boolean operation of the list, the two or more of the mesh structures with which the Boolean operation is associated in the first representation are combinable to realize the 3D object but the Boolean operation is not actually applied to the two or more of the mesh structures in the first representation;
   generate, based on the first representation, a second representation comprising an octree representing voxels that represent the 3D object in voxel space for building by the additive manufacturing machine, the voxel space having a plurality of sub-volumes of the voxels, each sub-volume contained within or partially overlapping with a corresponding one of the mesh structures,
      wherein the second representation is generated using, for each sub-volume, the Boolean operation associated with the corresponding one of the mesh structures that contains or partially overlaps with the sub-volume; and
   cause the 3D object to be built by the additive manufacturing machine using the second representation.

2. The non-transitory machine-readable storage medium of claim 1, wherein each Boolean operation in the list is a union, a difference, or an intersection.

3. The non-transitory machine-readable storage medium of claim 1, wherein each sub-volume has a plurality of node points that define the sub-volume.

4. The non-transitory machine-readable storage medium of claim 3, wherein the second representation is generated by:
   for each sub-volume, assigning each node point of the sub-volume with a first color or with a second color based on the Boolean operation associated with the corresponding one of the mesh structures that contains or partially overlaps with the sub-volume.

5. The non-transitory machine-readable storage medium of claim 4, wherein the second representation is generated by further, for each sub-volume
   assigning the sub-volume with the first color in response to all the node points of the sub-volume having the first color, such that the sub-volume is part of the 3D object;
   assigning the sub-volume with the second color in response to all the node points of the sub-volume having the second color, such that indicating that the sub-volume is not part of the 3D object; and
   assigning the sub-volume with a third color in response to one or more of the node points of the sub-volume having the first color and one or more other of the node points of the sub-volume having the second color.

6. The non-transitory machine-readable storage medium of claim 5, wherein the second representation is generated by further
   subdividing into further sub-volumes each sub-volume having the third color.

7. The non-transitory machine-readable storage medium of claim 4, wherein assigning each node point of the sub-volume with the first color or with the second color based on the Boolean operation associated with the corresponding one of the mesh structures that contains or partially overlaps with the sub-volume comprises:
   In response to the Boolean operation being a union or intersection operation, assigning each node point within the corresponding one of the mesh structures with the first color and assigning each node point outside the corresponding one of the mesh structures with the second color; and
   in response to the Boolean operation being a difference operation, assigning each node point outside the corresponding one of the mesh structures with the first color and assigning each node point within the corresponding one of the mesh structures with the first color.

8. The non-transitory machine-readable storage medium of claim 3, wherein, for each sub-volume, the node points of the sub-volume comprise corners of a bounding box of the sub-volume.

9. A system comprising:
   a processor; and
   a non-transitory storage medium storing instructions executable on the processor to:
      receive a first representation of a three-dimensional (3D) object for building by an additive manufacturing machine,
         wherein the first representation specifies a list of mesh structures and a list of Boolean operations, and associates each Boolean operation with two or more of the mesh structures,
         wherein for each Boolean operation of the list, the two or more of the mesh structures with which the Boolean operation is associated in the first representation are combinable to realize the 3D object but the Boolean operation is not actually applied to the two or more of the mesh structures in the first representation;
      generate, based on the first representation, a second representation comprising an octree representing voxels that represent the 3D object in voxel space for building by the additive manufacturing machine, the voxel space having a plurality of sub-volumes of the voxels, each sub-volume contained within or partially overlapping with a corresponding one of the mesh structures,
         wherein the second representation is generated using, for each sub-volume, the Boolean operation associated with the corresponding one of the mesh structures that contains or partially overlaps with the sub-volume; and
      cause the 3D object to be built by the additive manufacturing machine using the second representation.

10. The system of claim 9, wherein each sub-volume has a plurality of node points that define the sub-volume, and wherein the second representation is generated by:
    for each sub-volume, assigning each node point of the sub-volume with a first color or with a second color based on the Boolean operation associated with the corresponding one of the mesh structures that contains or partially overlaps with the sub-volume.

11. The system of claim 10, wherein assigning each node point of the sub-volume with the first color or with the second color based on the Boolean operation associated with the corresponding one of the mesh structures that contains or partially overlaps with the sub-volume comprises:

In response to the Boolean operation being a union or intersection operation, assigning each node point within the corresponding one of the mesh structures with the first color and assigning each node point outside the corresponding one of the mesh structures with the second color; and in response to the Boolean operation being a difference operation, assigning each node point outside the corresponding one of the mesh structures with the first color and assigning each node point within the corresponding one of the mesh structures with the first color.

12. A method of a system comprising a hardware processor, comprising:

receiving job information comprising a first representation of a three-dimensional (3D) object for building by an additive manufacturing machine,
   wherein the first representation comprising specifies a list of mesh structures and a list of Boolean operations, and associates each Boolean operation with two or more of the mesh structures,
   wherein for each Boolean operation of the list, the two or more of the mesh structures with which the Boolean operation is associated in the first representation are combinable to realize the 3D object but the Boolean operation is not actually applied to the two or more of the mesh structures in the first representation;

generating, based on the first representation, a second representation comprising an octree representing voxels that represent the 3D object in voxel space for building by the additive manufacturing machine, the voxel space having a plurality of sub-volumes of the voxels, each sub-volume contained within or partially overlapping with a corresponding one of the mesh structures,
   wherein the second representation is generated using, for each sub-volume, the Boolean operation associated with the corresponding one of the mesh structures that contains or partially overlaps with the sub-volume; and causing the 3D object to be built by the additive manufacturing machine using the second representation.

13. The method of claim 12, wherein each sub-volume has a plurality of node points that define the sub-volume, and wherein the second representation is generated by:

for each sub-volume, assigning each node point of the sub-volume with a first color or with a second color based on the Boolean operation associated with the corresponding one of the mesh structures that contains or partially overlaps with the sub-volume.

* * * * *